Patented May 28, 1940

2,202,115

UNITED STATES PATENT OFFICE 2,202,115

TREATMENT OF HYDROCARBONS

Jacque C. Morrell, Chicago, Ill., assignor to Universal Oil Products Company, Chicago, Ill., a corporation of Delaware No Drawing. Application December 30, 1937, Serial No. 182,519

12 Claims. (Cl. 260—676)

This application is a continuation-in-part of my co-pending application, Serial No. 32,638, filed July 22, 1935.

This invention relates particularly to the treatment of paraffin hydrocarbons which are gaseous at ordinary temperatures and pressures and particularly propane and the butanes, though in its general application it may include the treatment of ordinarily liquid paraffin hydrocarbons, as well as naphthenes or cyclo-paraffin hydrocarbons.

In a more specific sense the invention is concerned with a novel process for alkylating 3 and 4 carbon atom paraffin hydrocarbons with olefins which are normally gaseous to produce saturated hydrocarbons of higher molecular weight which can be utilized as constituents of motor fuel for automobile and aeroplane engines.

There is a very large production of fixed gases in connection with the production and refining of petroleum. Large amounts of paraffinic gases occur as natural gas and well or casing-head gases and further quantities are produced incidental to the cracking of the heavier portions of petroleums with the principal object of producing gasoline. Petroleum gases are as a rule utilized only as fuel and from the standpoint of the oil refiner who is primarily concerned with the manufacture of gasoline and lubricating oils these gases are mainly considered as waste material, so that considerable experimentation has been conducted to find methods for converting them into liquid products with practical efficiency.

The utilization of these gaseous materials has been attempted by employing straight thermal treatment without catalysts, which methods involve ordinarily relatively higher temperatures and pressures than those employed in oil cracking operations and by catalytic processes which as a rule operate under less severe conditions. The present process is related to the latter types of processes and the catalytic materials specified may also be employed in reactions involving the alkylation of normally liquid paraffins or naphthenes when conditions are modified to take into account the reactivities of the various hydrocarbons.

In one specific embodiment the present invention comprises the alkylation of paraffin hydrocarbons with normally gaseous olefin hydrocarbons at temperatures within the approximate range of —50 to +20° C. and preferably below 0° C. with catalysts comprising generally hydrochloric acid and metals.

One essential feature of the present invention in the case of the alkylation of normally gaseous paraffin hydrocarbons with normally gaseous olefin hydrocarbons is the utilization of sufficiently low temperatures so that the ordinarily vigorous action of the general class of catalysts mentioned in catalyzing condensation reactions among hydrocarbons is moderated and reactions of alkylation occur rather than simple polymerization of the olefins involved. In other words, at the selected low temperatures employed, the rate of the polymerization reactions among the olefins is reduced while the rate of the alkylation of the paraffins by the olefins is not reduced to the same extent so that alkylation of paraffins takes place in preference to simple polymerization of the olefins involved. When more elevated temperatures are employed which may be found necessary for accomplishing the alkylation of normally liquid paraffins or naphthenes, conditions in respect to proportioning of the reacting hydrocarbons and the amount and character of the catalyst combination may be suitably modified.

As a basis for the present invention it has been found that combinations of hydrochloric acid and certain metals are effective catalysts in promoting alkylation reactions leading to the formation of derivatives of paraffins and naphthene hydrocarbons by the addition of olefins thereto. While sufficiently good results in bringing about the desired reactions may be obtained with numerous combinations of acids and metals, it will be obvious to those conversant with catalysis in its general aspects that not all combinations will have equivalent effects in accelerating or promoting the desired reactions. Good results have been obtained with such metals as aluminum, zinc, manganese, chromium, iron, cadmium, cobalt, nickel, tin, and lead as representing the heavy metals above hydrogen in the electrochemical series. Good results have also been obtained when employing simultaneously the metals above and below hydrogen in the electrochemical series either in mechanical admixture or as alloys. For example, brasses consisting of definite proportions of zinc and copper, and bronzes containing essentially zinc, tin and copper have been found to be very effective when used in conjunction with hydrochloric acid.

Apart from the temperature range specified as preferable when alkylating normally gaseous paraffins with normally gaseous olefins, those employed when reacting a given saturated hydrocarbon with a given olefin hydrocarbon will be varied considerably and beneficial effects may also be obtained by increasing the pressure which has a general effect in increasing the capacity of any given apparatus which may be employed and specific effects in causing the liquefaction of and/or solution of normally gaseous reacting components so that the reactions take place in substantially liquid or mixed liquid-vapor phase.

The process of the invention is particularly applicable to the alkylation of propane and the butanes with their olefinic counterparts propylene and the butylenes respectively and also with ethylene. These alkylation reactions are of particular importance in the oil industry in connection with the cracking process, the fixed gases from which ordinarily contain large quantities of 3 and 4 carbon atom hydrocarbon both olefinic and saturated. Processes are at the present time in commercial operation which either thermally or catalytically polymerize the 3 and 4 carbon atom olefins to form liquid products suitable as hydrocarbon motor fuel but in both types of processes the paraffinic hydrocarbons in the selected fractions or mixtures are substantially unaffected so that the gasoline-forming potentialities of the gases are not completely utilized. By means of the present process the olefins are caused to combine to a large extent with the corresponding paraffins to produce gasoline boiling range liquids of a saturated but still of a high antiknock character so that the ultimate yield of light hydrocarbon liquids from cracked gas mixtures such as stabilizer refluxes is considerably increased.

The features of the present invention also find application in the alkylation of paraffin or cycloparaffin hydrocarbons or their mixtures which are normally liquid. The temperature range previously mentioned is the one most applicable when dealing with the alkylation of propane and the butanes but in the case of other paraffins this range may be extended to include the temperatures most suitable for any given saturated hydrocarbons or mixture of saturated hydrocarbons including paraffins and naphthenes such as are present in straight run gasoline of a paraffinic or mixed base character. Owing to the extensive possibilities in combinations of different olefins with different paraffins which might be employed in the reactions the total range of operating conditions which the invention comprises is somewhat difficult to state. Pressures may be employed when necessary to prevent undue losses of materials by vaporization and maintain the hydrocarbons undergoing reaction substantially in liquid phase.

The actual operation of the process admits of some modification depending upon the normal phase of the reacting constituents and whether batch or continuous operations are employed. In a simple type of batch operation a hydrocarbon to be alkylated, such as, for example, normal or isobutane is cooled to a temperature within the approximate range specified in the presence of a metal or metals selected from the group already mentioned and its alkylation may be effected by the gradual introduction of hydrochloric acid and an olefin, such as, for example, isobutylene under the surface of the liquid which may be mechanically stirred to assure intimate contact between hydrochloric acid, metal, and reacting hydrocarbons. In another method of operation a paraffin may be mixed with a liquid olefin at a suitably low temperature, a suitable amount of hydrochloric acid catalyst added and the reactions of alkylation induced by a sufficiently long contact with metals. Alkylation may be allowed to progress to different stages of replacement. In the case of the alkylation of propane or butanes with propylene or the butylenes, the best products from the standpoint of motor fuel usually are produced by the condensation of equimolecular quantities. After a batch treatment is completed the upper hydrocarbon layer may be removed by decantation or mechanical filtration and subjected to fractionation for the removal of uncombined hydrocarbons as a light overhead and the recovery of an intermediate motor fuel fraction.

In continuous operation a liquid mixture of paraffins and olefins containing dispersed therein the requisite amount of hydrochloric acid and cooled to a suitably low temperature may be pumped through a tubular heater containing finely divided or granular metals, the desired alkylation reactions taking place during passage through the heater and the fractionation of the product being accomplished in succeeding fractionating equipment. The details of continuous processes of this general character are more or less familiar to those skilled in commercial operations and any necessary additions to or modifications of the general procedures will be more or less obvious, and can be made without departing from the general scope of the invention.

While the present process possesses particular advantages in connection with the utilization of the gases produced in oil cracking plants, it has a broader significance and includes generally the interaction of any olefin and any paraffin or mixtures thereof at temperatures at which alkylation reactions are fostered by the preferred catalyst combinations in preference to the simple polymerization of the olefins.

The following example is given as illustrative of the type of results normally obtainable by the use of the present process, although it is not given with the intention of limiting the generally broad scope of the invention.

50 parts by weight of n-butane were alkylated by 45 parts of propylene. The butane was cooled to a temperature of $-25°$ C. and 10–15 parts by weight of zinc powder were added and maintained in suspension by an efficient stirring device. During vigorous agitation a cooled stream of propylene was introduced along with a small amount of hydrochloric acid to accomplish the alklation. The proplene was added at such a rate that it was substantially completely absorbed. After the requisite amount had been passed into the acid-oil mixture the stirring was stopped and the aqueous-acid layer allowed to settle. The upper hydrocarbon layer was then found to consist of 85 parts by weight of hydrocarbon product which was paraffinic as indicated by its non-reactivity with potassium permanganate solution and nitrating mixture. This hydrocarbon layer was principally a mixture of heptanes of an isomeric character along with some lower molecular weight products. The octane number by the C. F. R. motor method was found to be 83.

The broad scope of the present invention is evident from the preceding specification and the results obtainable by its use in practice are evident from the examples given although neither section is intended to be unduly limiting.

I claim as my invention:

1. A process for the production of octanes which comprises subjecting butanes at temperatures of the order of $-50$ to $+20°$ C. to treatment with butenes in the presence of hydrochloric acid and zinc.

2. A process for producing alkyl derivatives of paraffin hydrocarbons which comprises reacting a paraffin with an olefin under alkylating conditions and in the presence of hydrochloric acid and a metal above hydrogen in the electrochemical series selected from the group consisting of aluminum, zinc, manganese, chromium, iron, cadmium, cobalt, nickel, tin and lead.

3. The process as defined in claim 2 further characterized in that said paraffin is a straight-chain paraffin.

4. The process as defined in claim 2 further characterized in that said paraffin is a butane.

5. A process for producing alkyl derivatives of paraffin hydrocarbons which comprises reacting a paraffin with an olefin at a temperature of the order of —50 to +20° C. and in the presence of hydrochloric acid and a metal above hydrogen in the electrochemical series selected from the group consisting of aluminum, zinc, manganese, chromium, iron, cadmium, cobalt, nickel, tin and lead.

6. A process for producing hydrocarbons boiling within the gasoline range which comprises reacting a normally gaseous paraffin with a normally gaseous olefin under alkylating conditions and in the presence of hydrochloric acid and a metal above hydrogen in the electrochemical series selected from the group consisting of aluminum, zinc, manganese, chromium, iron, cadmium, cobalt, nickel, tin and lead.

7. A process for producing hydrocarbons boiling within the gasoline range which comprises reacting a normally gaseous paraffin with a normally gaseous olefin at a temperature of the order of —50 to +20° C. and in the presence of hydrochloric acid and a metal above hydrogen in the electrochemical series selected from the group consisting of aluminum, zinc, manganese, chromium, iron, cadmium, cobalt, nickel, tin and lead.

8. A process for producing alkyl derivatives of paraffin hydrocarbons which comprises reacting a paraffin with an olefin under alkylating conditions and in the presence of hydrochloric acid and zinc.

9. The process as defined in claim 8 further characterized in that said paraffin is a straight-chain paraffin.

10. The process as defined in claim 8 further characterized in that said paraffin is a butane.

11. A process for producing hydrocarbons boiling within the gasoline range which comprises reacting a normally gaseous paraffin with a normally gaseous olefin under alkylating conditions and in the presence of hydrochloric acid and zinc.

12. A process for producing hydrocarbons boiling within the gasoline range which comprises reacting a normally gaseous paraffin with a normally gaseous olefin at a temperature of the order of —50 to +20° C. and in the presence of hydrochloric acid and zinc.

JACQUE C. MORRELL.